United States Patent

[11] 3,607,301

[72] Inventor Arthur Bratland
Maudsvei 9, Heie, Nøtterøy, Norway
[21] Appl. No. 764,345
[22] Filed Oct. 1, 1968
[45] Patented Sept. 21, 1971

[54] PRODUCTION OF WHIPPABLE CREAM
12 Claims, No Drawings

[52] U.S. Cl. .................................................. 99/60, 99/62
[51] Int. Cl. ..................................................... A23c 13/00, A23c 13/12
[50] Field of Search .......................................... 99/60, 54, 62

[56] References Cited
UNITED STATES PATENTS
3,066,028  11/1962  Petini et al. .................... 99/60
3,468,671  9/1969   Bratland ........................ 99/60

OTHER REFERENCES
Thomas et al., Journal of Dairy Science. Vol. 27 1944 (page 420) SF221J8
Jenness et al., Principles of Dairy Chemistry. Chapman & Hall, Limited, London 1959 (page 296) SF253J4C.2

*Primary Examiner*—Lionel M. Shapiro
*Assistant Examiner*—D. M. Naff
*Attorney*—Kenyon & Kenyon Reilly Carr & Chapin

ABSTRACT: A process for producing whipping cream having a fat content not greater than of the order of 25 percent by weight involving the step of expelling and separating pure butter oil from a milk product having above 15 percent by weight of milk fat and adding the remainder to a cream to constitute said whipping cream.

PRODUCTION OF WHIPPABLE CREAM

This invention relates to a process for the production of whippable cream. As is well-known, work to produce whippable types of cream having a lower fat content than conventional whipping creams has been carried out in recent years to an extensive degree. One of the main reasons for this is that nutrient physiologists are of the opinion that the daily diet in many countries, especially in Europe and among others North America, is too rich in calories and also too rich in fat. Another important reason has also been the suspicion that animal fat is a strong contributing factor to an excessive cholesterol count in the blood, and hardening of the arteries which follows from this. Even though, hitherto, there has been no proof of any connection here, the preponderance of opinion has led to the desire to reduce the use of animal fat, of which milk fat is a typical representative.

Such types of cream having a low fat content have been produced with success by means of several different methods. A general characteristic of these has been the production initially of a conventional whippable cream, usually having the standardized fat content of 35 percent, after which the latter is "thinned" to the desired fat content, which is most often about 25 percent. Cream products have even been obtained in this way, in which the whippability, stability and other quality characteristics have been substantially improved relative to the usual commercial whipping cream. For such "thinning" various fractions obtained from genuine milk have been used without foreign additives, so that the products will be genuine milk products.

For certain purposes, however, these types of processes are not altogether or even satisfactory or even unsuitable. In some markets, the demands for branding the goods can be such that these cream products, despite their excellent quality can be placed in the class of substandard products. It is, therefore, desirable to provide an alternative process for producing such cream types, in which whippability is achieved another way.

The investigations which have been carried out in connection with the aforementioned "thin" cream types have shown that a cream's whippability and a number of other properties, including its whitening ability in coffee, are due to a far less degree upon its milk fat content than was previously realized. Without binding the present invention to this explanation, the current theory point to complex compound of phosphorus lipoids and proteins as being a much more significant factor. In all the milk fractions which are mentioned above, by way of suggestion, for use in "thinning" the whipping cream, just such a complex compound will be concentrated.

Such concentrating is however not so easy to attain, because with stronger chemical, semichemical or physical influences, the bond between phosphorus lipoids and proteins can easily be broken. Thus, phosphorus lipoids alone will not give the desired result.

In conventional churning to butter, the whole of the quantity of fat is separated, so that this way is not practicable. Besides, it has been shown that definite quantities of the complex compound remain even in butter, and that the aqueous fraction which is present in butter contains quite large quantities of the complex compound.

It has now been shown that in the total phase exchange and separation of pure butter oil, the complex compound apparently remains behind in the aqueous fraction.

By utilizing this discovery, it has been possible to provide two alternative novel ways of preparing whippable cream.

According to the present invention, a process is provided for producing whippable cream wherein a lipoid fraction which contains more than 90 percent milk fat is separated from a milk product having more than 15 percent milk fat with the remaining aqueous fraction being utilized to obtain a whippable cream having a low fat content. Preferably, the whipping cream has a fat content of from 20 to 25 percent by weight.

In one of the two alternative processes, the aqueous fraction can be separated from unsalted and nonacidified butter by, for instance, melting of the butter and centrifuging. Only small quantities of the aqueous fraction are required for addition to the starting cream because the fraction is rich in whipping-promoting ingredients. The butter oil which is obtained by this procedure, finds application as a fat raw material for use in the recombination. Pure (99,5percent) butter fat is preferred as the fat raw material in recombining because it has largely an unlimited durability, in contrast to butter, which will go rancid on storage.

Turning to the other alternative process upon homogenization the general desire is to reduce the size of the fat particles, so that they remain fluid in the aqueous medium which surrounds them.

In particular apparatuses operating according to a centrifugal principle however, there is a tendency for a degree of coagulation of the fat particles to occur which, under certain working conditions, can even result in the separation of a pure butter fat.

Several different types of homogenizors or similar apparatuses exist, which operate according to this principle and lead, with the appropriate choice of working conditions to a separation of pure butter fat. As an example the Swedish firm AB Separators' "Clarifixator" can be mentioned. A description of this appears for example in the Commemorative Address for the Swedish Inventors Association's seventy-fifth years jubilee: "From Idea to Product" Stockholm 1961, pages 15–22. It is well known that at a high temperature and high centrifugal effect there is obtained a partial separation of pure butter oil with such an apparatus.

By exposing a whippable cream having a content of at least 30 percent butter fat to the requisite separating conditions, the degree of butter fat separation can be controlled so that the residual cream possesses the desired low fat content, preferably from between 20 and 25 percent.

Desirably working is at temperatures about 37° C., a suitable working temperature being from 50–55° C.

The invention will now be illustrated with reference to the following examples:

EXAMPLE 1

Freshly churned, nonacidified and unsalted butter having a fat content of about 85 percent was melted and subjected to centrifuging in the melted condition. The separated butter oil contained 99.5 percent fat and was packed hermetically to be used as a source of fat on recombining. The aqueous fraction was collected and used to lower the fat content of a 30 percent nonwhippable summer cream to 25 percent. The content of the fat-free dry material was increased by the addition of 1 percent buttermilk powder. The cream obtained had a whipping time of 110 seconds with a volume increase of 130 percent and almost no serum formation.

EXAMPLE 2

In an homogenizor of the "Clarifixator" type from AB Separator the speed of rotation was increased to double by means of a transmission, and there was supplied 35 percent whippable cream at a speed of about half the usual feeding speed. The temperature of the cream supplied was maintained at 55° C., the same as in example 1. The discharged cream was treated in a centrifuge at 55° C., and so much butter oil having a degree of purity of 96.5 was separated out that the residual cream had a fat content of 24.6 percent. The cream had a whipping time of 110 seconds, a volume increase of 135, and a serum formation of 2ml./100 ml. unwhipped cream.

What I claim is:

1. A process for producing whipping cream capable of being whipped to a whipped cream and having a fat content not greater than 25 percent by weight which comprises separating an oil fraction containing more than 90 percent by weight fat and an aqueous fraction from either (a) butter having a fat content of not less than 80 percent by weight or (b) a cream having a fat content of not less than 30 percent by weight, the aqueous fraction from (a) being added to a cream having a fat content of not less than 30 percent by weight to lower the fat content of said latter cream to a content not greater than 25 percent by weight to form said whipping cream, and the aqueous fraction from (b) constituting said whipping cream per se.

2. A process according to claim 1, in which the final whipping cream has a fat content of from 20 to 25 percent by weight.

3. A process according to claim 14, in which the butter (a) is unsalted and nonacidified.

4. A process according to claim 1 which comprises feeding the cream (b) to an homogenizing apparatus of the "Clarifixation" type operating on the centrifugal principal, at a temperature of above 37° C. and at a feeding rate of approximately 50 percent that which is normal for homogenization, said apparatus being revolved at a sped approximately twice its normal speed, and thereafter while maintaining said temperature centrifuging the discharged cream therefrom to separate said cream into said oil fraction and said aqueous fraction.

5. A whipping cream consisting of natural ingredients normally present in milk and having a fat content of not more than 25 percent by weight made in accordance with a method as set forth in claim 1.

6. A process according to claim 1, which comprises separating the aqueous fraction from the butter (a) by melting and subsequent centrifuging.

7. A process according to claim 1, which comprises adding the aqueous fraction from butter (a) to a nonwhippable cream.

8. A process according to claim 1, in which the cream (b) is also a whipping cream.

9. A process for producing whipping cream having a fat content not greater than 25 percent by weight and being whippable into a whipped cream which comprises the steps of separating butter having a fat content of not less than 80 percent by weight into an oil fraction containing more than 90 percent by weight fat and an aqueous fraction, and adding said aqueous fraction to a cream having a milk fat content of not less than 30 percent by weight to lower the fat content of said cream to less than 25 percent by weight to form the whipping cream.

10. A process of producing whipping cream having a fat content not greater than 25 percent by weight fat and being whippable into a whipped cream which comprises the step of separating a cream having a fat content of not less than 30 percent by weight into a fraction containing more than 90 percent by weight fat and an aqueous fraction of not greater than 25 percent by weight fat, said aqueous fraction constituting the whipping cream.

11. A process as set forth in claim 9 wherein said final whipping cream has a fat content of from 20 percent 25 percent by weight.

12. A process as set forth in claim 10 wherein said final whipping cream has a fat content of 24.6 percent by weight.

UNITED STATES PATENT OFFICE
CERTIFICATE OF CORRECTION

Patent No. 3,607,301              Dated September 21, 1971

Inventor(s) Arthur Bratland

It is certified that error appears in the above-identified patent and that said Letters Patent are hereby corrected as shown below:

Column 1, line 39, "cream°s" should be --cream's--

Column 3, line 8, "14" should be --1--

Column 3, line 15, "sped" should be --speed--

Signed and sealed this 14th day of March 1972.

(SEAL)
Attest:

EDWARD M. FLETCHER, JR.
Attesting Officer

ROBERT GOTTSCHALK
Commissioner of Patents